US005315656A

United States Patent [19]

Devaux et al.

[11] Patent Number: 5,315,656

[45] Date of Patent: May 24, 1994

[54] SYSTEM FOR PROTECTING DOCUMENTS OR OBJECTS ENCLOSED IN A TAMPER-PROOF CONTAINER

[75] Inventors: Franklin Devaux, Couternon; Marc Geoffroy, Saint Julien; Christophe Genevois, Dijon, all of France

[73] Assignee: AXYVAL (Societe Anonyme), Dijon Cedex, France

[21] Appl. No.: 876,712

[22] Filed: Mar. 16, 1992

[30] Foreign Application Priority Data

Jul. 17, 1989 [FR] France ................................ 89 09579

[51] Int. Cl.$^5$ ................................................ H04L 9/10

[52] U.S. Cl. ........................................ 380/23; 380/52

[58] Field of Search ............... 380/23, 29, 52; 109/29, 109/36, 37

[56] References Cited

U.S. PATENT DOCUMENTS

| | | | |
|---|---|---|---|
| 4,236,463 | 12/1980 | Westcott | 109/36 |
| 4,691,350 | 4/1987 | Kleijne et al. | 380/52 |
| 4,691,355 | 9/1987 | Winstrom et al. | 380/23 |
| 4,860,351 | 8/1989 | Weingart | 380/52 |
| 4,942,831 | 7/1990 | Tel | 109/29 |
| 5,159,624 | 10/1992 | Double et al. | 380/52 |

FOREIGN PATENT DOCUMENTS

| | | | |
|---|---|---|---|
| 0030413 | 6/1981 | European Pat. Off. . | |
| 0307375 | 3/1989 | European Pat. Off. . | |
| 3400526 | 10/1985 | Fed. Rep. of Germany | 109/36 |
| 2550364 | 2/1985 | France . | |
| 2574845 | 6/1986 | France . | |
| 2594169 | 8/1987 | France . | |
| 2615987 | 12/1988 | France . | |
| 9117681 | 11/1991 | PCT Int'l Appl. | 109/36 |

OTHER PUBLICATIONS

DES (English Data Encryption Standard), FIPS PUB 46 (Federal Information Processing Standards Publication 46).

International Search Report and Annex.

International Preliminary Examination Report.

*Primary Examiner*—Salvatore Cangialosi

*Attorney, Agent, or Firm*—Sandler, Greenblum & Bernstein

[57] ABSTRACT

A protection system for protecting valuables, such as, for example, drugs, banknotes, checks, bank cards or securities, that are contained in a physically impregnable storage container or box, in which the contents of the storage box are destroyed upon the detection of an attempted unauthorized access to the storage box. The storage box includes an internal management system that controls transitions between a plurality of operating modes in accordance with particular events, the validity of the transitions being authenticated and verified. If the contents of the storage box are destroyed, data stored in a memory of the internal management system is also erased, so as to prevent the unauthorized extraction of the data, which could possibly be used to gain access to other portions of the protection system.

18 Claims, 2 Drawing Sheets

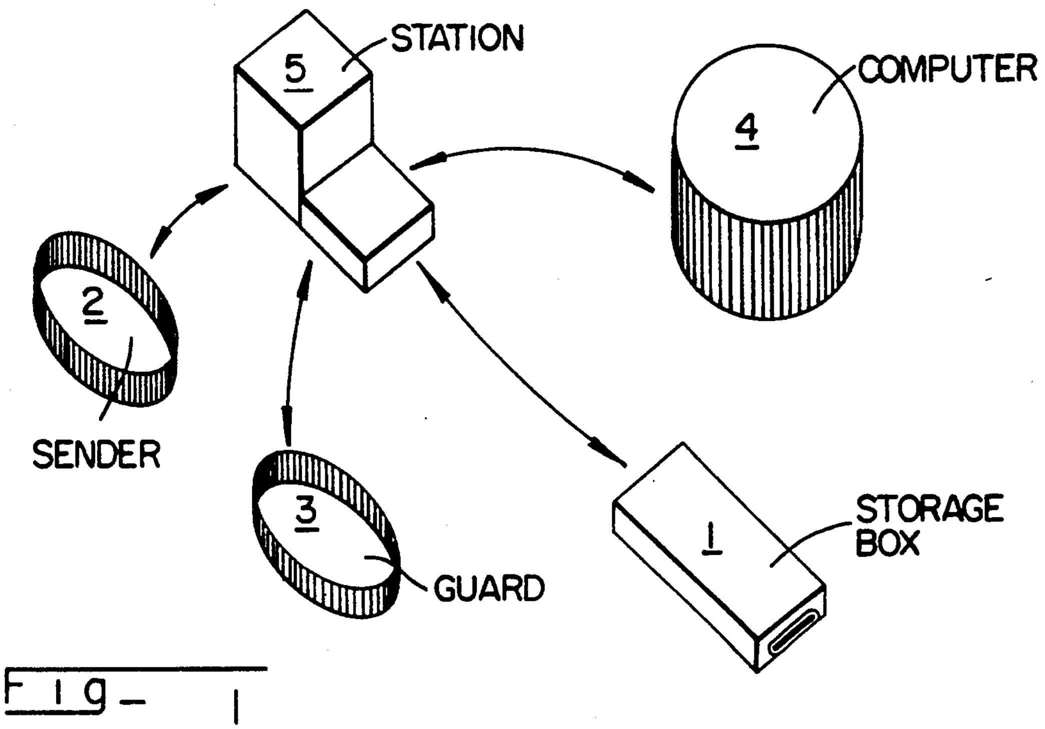
Fig- 1
Fig- 2
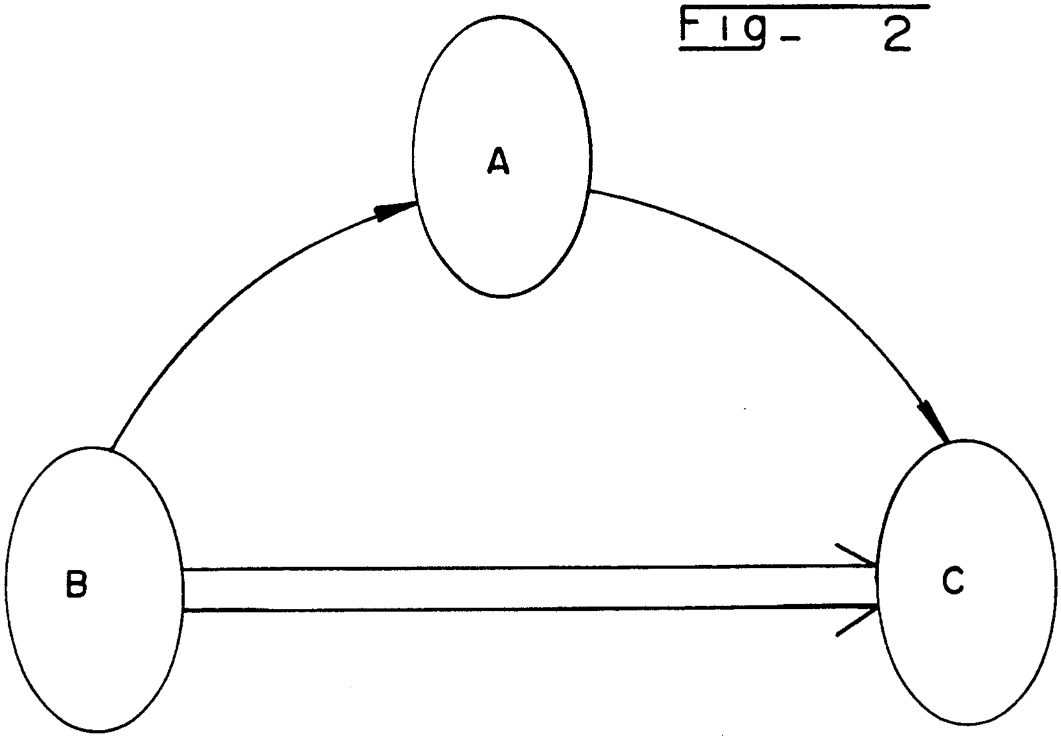

SYSTEM FOR PROTECTING DOCUMENTS OR OBJECTS ENCLOSED IN A TAMPER-PROOF CONTAINER

CROSS-REFERENCE TO RELATED APPLICATIONS

This application is a continuation of International Application No. PCT/FR90/00538 which has an international filing date of Jul. 17, 1990, and which designated and elected the United States, the disclosure of which International Application is incorporated by reference in its entirety.

BACKGROUND OF THE INVENTION

1. Field of the Invention

This invention concerns a system for protecting documents or valuables and in particular, means of payment, such as banknotes, checks or bank cards, enclosed in a physically tamper-proof container, which also goes through a series of logical states, authenticated in small numbers.

2. Discussion of Background and Relevant Information

Conventional systems for protecting documents or valuables, such as means of payment, are well known and most of them are widely based on the principle of a safe with armored plated walls, the access to which is reserved for the sole owners of a key, with a material or immaterial support (such as a code), and wherein the safe is located in a controlled environment made safe for example by means of several armored plating.

An alternative to these conventional devices, which are often heavy and cumbersome, is offered in several French patents in Applicants' name. In patent FR-A-2 550 364, the documents to be protected, hereinafter referred to as funds, are enclosed in a small box, the physical state of which is checked by means of sensors that continuously give out signals, which should comply with the signals resulting from a compulsory and ineluctable process, when a sensor detects a fault, the funds are destroyed or marked.

The destructive device used for this purpose can be, for example, that described in patent FR-A-2 574 845 in Applicants' name.

In the case of valuables to be transported, such as, for example, dangerous drugs (narcotics, poisons) or which have a considerable added value, the destructive device is very much different; the man of the trade is aware of the known, specific means in this field.

The object of the above mentioned patents consists in making useless or in destroying, in the event of an attack, the funds contained in a box and whose important fiduciary value is far lower than their real value, (which is the case for banknotes, cards and checks); the desirability for these funds thus becomes nil, since they are destroyed before they can be reached.

The sensors associated with these systems, and which in particular enable the detection of a physical attack on the small box, can be of a very light structure; an appropriate wall integrity sensor being described, for example, in French patent FR-A-2 615 987 in Applicants' name.

A certain number of inconveniences are linked with the systems of protection offered by the above-noted that patents endanger the very reliability of protection, both when the small box containing the funds to be protected is mobile and when the small box is stationary, and especially during transactions connected to changes in the state of the small box, such as, for example, when the small box is removed, is delivered, is opened or closed.

Indeed, in compliance with patent FR-A-2 550 364, the protection of a box is closely linked in itself to the protection of other small boxes that are transported by an armored vehicle in which they are placed. In such a case, the small boxes are protected as a whole, thanks to the existence of a secret and permanent signal, circulating between them. Any unexpected interruption of the signal causes damage to the funds to be protected. Such a device has a problem, that is difficult to resolve, of managing this signal, and the complexity thus involved leads to expensive, slow solutions that are not reliable.

Moreover, it appears that an individual protection of the small boxes can be realized and would even be preferable, since it would have the benefit of a flexible protective system and avoid destroying a large quantity of funds contained in numerous boxes, when the security of just one box is breached.

In addition, in the event of a small box and the funds contained in it are destroyed, the described systems of protection do not enable to determine the people responsible for the attack that caused the destruction; indeed, when it is destroyed, it is desirable and even necessary for the box to mark or destroy not only the funds, but also to erase any information that may be confidential and which it requires for its operation, such as, for example, supervision algorithms of its physical states, coding and decoding algorithms of messages exchanged with the outside, the nature and content of these messages such as secret codes, destination and addressees of the transported funds.

The destruction of all this information makes it impossible to identify, with any amount of certainty, the last person to have handled a destroyed box, who might just as well be an attacker from outside the system, an employee responsible for handling or transporting the small boxes and wanting to steal the funds or other people authorized for various reasons to approach the small boxes or to open them at their final destination.

Another major inconvenience of the system described in the FR-A-2 550 364 patent resides in the strict inexorability of the process governing the "history" of a small box during its transport. Any unexpected event is considered by the box to be an attack, leading to its destruction; thus, there is no possibility of grading the response when an unexpected event occurs. For example, when traffic is held up along a route an armored vehicle carrying the boxes should follow, the delay in delivery caused by the traffic jam will lead to destruction of the box, which could prove to be an expensive error and lead the client whose funds are being transported to question the reliability of the system.

It is not possible at the present time to give an immediate answer to this problem since the inexorability of certain phases of the transport described in this patent is compulsory with regard to security.

From the above, it is easy to understand that the use of a sole decision center to manage the whole security system leads to unavoidable dead-ends.

French patent FR-A-2 594 14 in the name of the Applicant is an improvement to the FR-A-2 550 364 patent. In this patent, small boxes are considered as being in a stationary vehicle, and are therefore used as bank compartments. Their protection is always collective, with the above mentioned problems, but access to the strongroom where the small boxes are stored is controlled from the outside by a computer that enters into contact with an electronic case dedicated to the supervision of the strongroom, which communicates in a secret and continuous way with all the small boxes. The communication of each of the small boxes with the outside computer enables the computer to generate a "history" of a box and to control the initiation which is carried out after various checkings, including those of the secret codes known to the persons having valid access to the boxes (i.e. a banker or a client).

The system described in this last document has several inconveniences. In addition, it is possible to design a clone computer that carries out the same functions as the original computer. Thus, the safety of the funds enclosed in the boxes is not entirely ensured, since there is no means of enabling the boxes to recognize the supervisor computer and the clone computer with any certainty.

When reading the above mentioned patent, one notes that the source of information giving the process data to the various electronic elements of the system is not necessarily the only one, which is a risk factor for the confidentiality of this data.

SUMMARY OF THE INVENTION

The present invention intends to improve in a decisive way the various known systems, by offering a system of protection for documents or valuables, and in particular, means of payment such as banknotes, checks or bank cards, enclosed in at least one physically tamper-proof container, called a small box, which, in the event of being attacked destroys them using a suitable means, this system being characterized by the fact that the small box includes internal management systems that operate like a "limited mode machine," the operating cycle of which includes a limited number of logical state, called modes, the transition from a first mode to a second mode taking place upon the occurring of a specific event, the nature of which is, or previously has been, ascertained by an autonomous method that is able to be put into contact with the internal management system of the small box, the transition then being accompanied by the loss of memory of the previous mode.

According to an object of the present invention, a logical state, called a mode, corresponds to each situation in which a small box might be found, this mode being limited by two explicit conceptual terminals which strictly and reliably organize the operating cycle of the internal management system of the small box, unlike the prior art systems known to date, which only know two implicit terminals, either "the transition between the mobile box and the stationary box" and reciprocally.

The present invention provides the flexibility necessary for more intelligently managing the protection of the boxes. But, it is therefore essential that at each stage of the protection process and at each transition between two logical states, the box does not retain any trace of its previous logical state. This trace is of no use, and is dangerous, since it is vital for the security of the system that confidential messages, such as codes, cannot be read if they are not entirely destroyed in the event of attack. Finally, we can understand, from the following, that this trace cannot exist.

The absence of a memory of the previous mode is essential for the security of the system, since two extreme modes of the operating cycle of the internal management system of a small box can be connected:

- either directly, thanks to a first event planned for this purpose which causes a transition between these two modes, or
- indirectly, by previous transitions in other modes, due to other events that are planned and authorized.

Should the box retain the memory of its previous mode, it would be possible to invalidate a transition previously accepted by the internal management systems of the box, between a first and second mode. A new event might cause a transition from a first mode to a third mode without it having been planned to authorize a transition from a second mode to this third mode. The system would consequently become "unmanageable."

In organizing the operating of the internal management systems of a small box in a cycle including a limited number of logical states, or modes, these systems having moreover as sole memory their own mode, this invention provides a reliable and sure way of defining various operating cycles which correspond to a number of situations that are inaccessible to systems know to date, for which a sole "history" may exist between the closing and opening of a box.

The particular operation of the internal management systems of the small box by a transition between logical states existing in limited numbers, should therefore be compared with the working of machines known as "limited mode machines," as follows:

A cash dispenser, drink vending machine or other similar machine forms a well known example of a "sequential logical machine." In a dispensing machine, it is known that if a ticket cost 5 francs, and that only 1, 2 and 5 Franc coins are accepted, it is not possible to obtain a ticket other than by "making the dispenser successively go through" several logical predefined operating modes which are part of the following exhaustive list: "pay 5 Francs" (state 5), "pay 4 Francs" (state 4), "pay 3 Francs" (state 3), "pay 2 Francs" (state 2), "pay 1 Franc" (state 1), "delivery of a ticket" (state 0). Authorized cycles to go from state 5 to state 0 are, for example:

- (state 5→"received 5 Franc coin"→state 0),
- (state 5→"received 2 Franc coin"→state 3→"received 2 Franc coin"→state 1→"received 1 Franc coin" →state 0),
- (state 5→"received 1 Franc coin"→state 4→"received 1 Franc coin"→state 3→"received 1 Franc coin"→state 2→"received 2 Franc coin"→ state 0),
- (state 5→"received 1 Franc coin"→state 4→"received 2 Franc coin"→state 2→"received 2 Franc coin"→state 0), and so on.

In this respect, the events "received x Franc coin" are specific events. At the moment when the dispenser is in a given state, it does not matter whether it "remembers" the way in which it reached that state. The memory of the previous state, even if it were possible, is thus normally useless.

It should also be noted that the dispenser has two types of circuits (electrical, electronic, mechanical, optical, etc.):

- printing, storage and dispensing circuits for tickets (drinks, or other),
- circuits for managing the operating automatic systems, such as described above, these management circuits normally being composed of an electronic interface.

The analogy of a small box in accordance with the invention with an automatic dispenser is fairly accurate. In particular, the small box of the present invention has two types of circuits:

circuits, or systems, for the physical protection (container, drawer, box, etc.) and the possible destruction of the funds in the event of an attack (explosive and other similar means), and circuits, or means of internal management, such as an electronic interface, also including means for communicating with a service center or a station.

The strictness of such an organization for a protective system in compliance with the invention implies an extra intelligence making the small boxes and the system as a whole somewhat "logically tamper-proof."

This logical tamper-proofness is also expressed in that, according to another characteristic of the invention, during the transport of a small box, in which a transition from a mode where the small box is considered as being fixed to a mode where it is considered as being mobile, and also by a transition from a mode where the small box is considered as being mobile, to a mode where it is considered as being fixed, the internal management systems of the small box are entirely autonomous, i.e. the sole responsibility for the security of the funds is contained in the small box.

Thus, the small box may share this responsibility with other parties in the system, which are, for example, outside its transportation, with the autonomous means that can enter into contact with the internal management systems of the small box.

BRIEF DESCRIPTION OF THE DRAWINGS

The foregoing and other objects, features, and advantages of the invention will be apparent from the following more particular description of the preferred embodiments, as illustrated in the accompanying drawings, and wherein:

FIG. 1 is a synoptic diagram of the organization of a network of a system according to the present invention;

FIG. 2 is a diagram showing the design of transitivity of the authentications.

DESCRIPTION OF THE PREFERRED EMBODIMENTS

Figure 3:
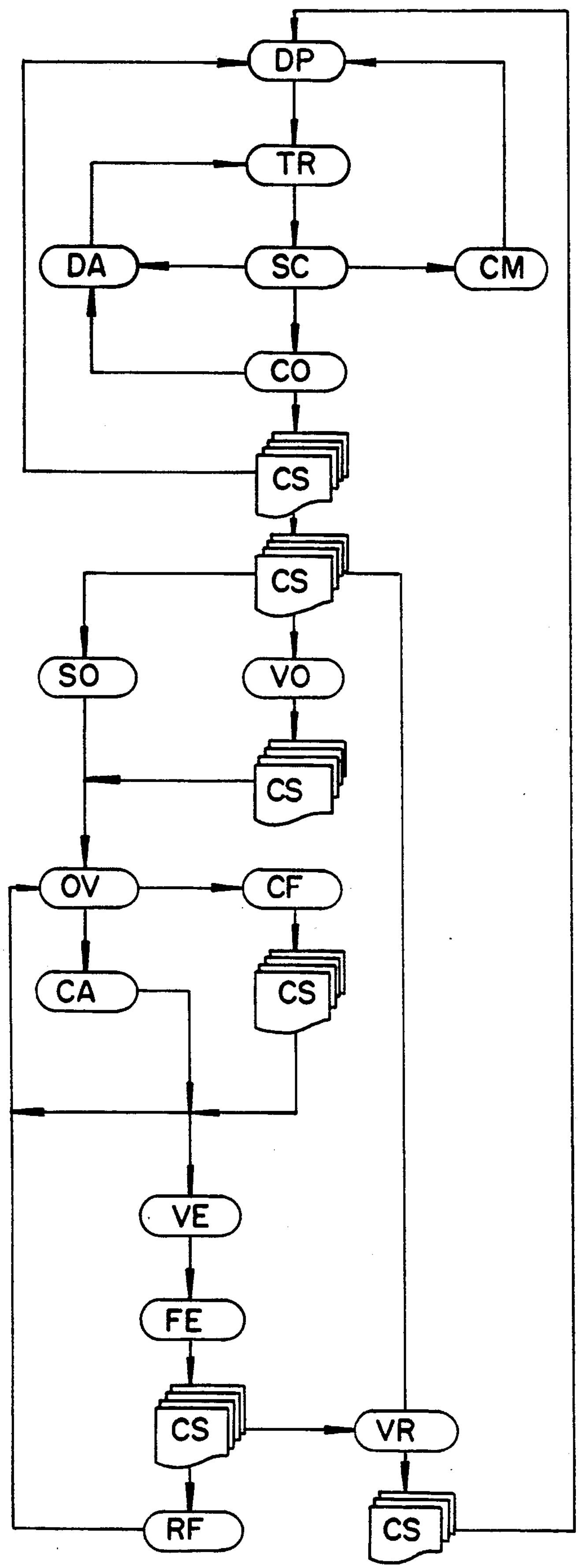
FIG. 3 is a logical flowchart of the possible transitions provided between the system's operating modes, in accordance with a special version of the invention.

FIG. 1 discloses a system in accordance with the present invention that is used for the protection of funds which have been placed in a small box 1 by a person in charge of a bank, hereinafter called a sender 2. Box 1 can be transported by, for example, a security guard 3 to one of the bank's other branches.

In one of the preferred versions of the invention, the means capable of communicating with the boxes is formed by a sole computer 4.

Computer 4 acts as supervisor and manages the logical security of the boxes 1, i.e. check the nature of the transitions from certain operating modes of their internal management systems to certain other modes.

During these transitions, an extension or reduction of the protective system in accordance with the invention occurs. Three cases can be mentioned:

a) during transport, the funds can only be protected by the small box 1 in which they are contained; in this situation, the system only includes the box 1;

b) at the end of transport, at the time of delivery, only a source of information from outside the box 1 can interrupt the mode in which it was placed at the beginning of the transport and which is its sole memory; the system should then be extended to the outside source of information, i.e. the computer 4, which should, prior to this extension, be recognized by the box as a reliable and sure partner; and c) after delivery, the protection of the funds enclosed in the box 1 is still total since its opening requires the extension of the system to a second outside source of information—the user of these funds (broadly speaking, an addressee, sender 2, security guard 3)—who should, in turn, be recognized as a reliable and sure partner by the box 1 and computer 4.

Thus, there are three types of modes for the small box 1 and the system as a whole, but the sole box 1 is a part of the protective system since it is precisely this box which enables one to suppress the covetousness of third parties, depending on whether it is considered as mobile and closed, in accordance with case a), or immobile and closed, as in case b), or, finally, whether it is immobile and open, as in case c).

The transitions between these three types of modes depend on the transfer of responsibility attached to the protection of funds, whether they are enclosed in a box (before dispatch, these funds are freely placed by the sender 2 in the box 1 and, until confirmation of their being taken in charge by the system, sender 2 is responsible for them).

The mobility of box 1 is therefore a purely logical attribution of the system, which goes beyond its actual physical mobility. This considerable advantage of the system is one of the most unexpected consequences of the organization in limited mode machine of the physically mobile part of the system, i.e. the small box 1.

Moreover, an unexpected advantage in the use, in accordance with the present invention, of a sole computer 4 supervising the system, is to limit the redundancy of the information necessary for its management i.e. their possible transfer. If a second computer were to exist, one could be placed, for example, at the place of departure of a box and another at its place of arrival, which is precisely the case in the system described in French patent FR-A-2 594 169, wherein it is necessary to integrate the second computer in a reliable way into the system:box/first computer:so that it becomes a system:box/first computer/second computer; the reliable integration of the addressee of the funds enclosed in box 1 would then become possible through this second computer. But the use of a second computer is not necessary in the present invention, as it neither simplifies nor gives added security, since the addressee of the funds is directly integrated by the first computer.

Finally, it should be noted that the boxes 1 are totally separate from each other and that each system, box/-computer/user, should be considered as an individual network, even if the supervisor computer 4 might be the same for all the boxes 1. Therefore, there is no dialogue that continuously circulates between the boxes 1, which is an advantage compared to the system described in the FR-A-2 550 364 patent.

According to the present invention, there is only one series of specific dialogues. During these dialogues, the exchanged messages do not endanger the security of the system. That is why the links established between the parties are an integral part of this system, their failure being considered as an attack on the system.

These links can have a material support, the nature of which can be more easily protected, for example by armored plating. But despite everything, it is possible to give an answer to the problems of confidentiality without having to use these physical protections.

According to an extra feature of the present invention, an in compliance with FIG. 1, the four parts: box 1, computer 4, sender 2 and security guard 3, can be connected to a sole terminal, hereinafter called station 5, to form a star network, of which the station 5 is the center.

In this way, there is a first station 5 at the place of departure of a box 1 and another station 5 at its place of arrival. The multiplicity of stations 5 does not, however, affect the security of the system, since, in accordance with a very important feature of the invention, stations 5 only form points of passage for confidential information. Thus, in accordance with the present invention, a station 5 can never form a means liable of controlling the elicit nature of an event that might cause a transition from a mode of operating the internal management systems of a small box 1 to another mode.

The use of a star network secures a number of well known advantages. In particular, a message exchanged between two integral parts of a star network does not travel through the other parts, as occurs, for example, in a ring network.

Moreover, in order to be able to communicate, each of the parts of the system has an electronic interface which manage exchanges, which are sometimes complex. The use of a station 5 that can connect all the parts between each other in compliance with the invention simplifies the interfaces.

For example, it is not necessary to transport sophisticated means of communication requiring an important electronic system with box 1. Also, the connection of a user (e.g. sender 2, security guard 3) with the other parts of the system remains simple.

Station 5 is equipped with all the heavy electronic interfaces for that purpose and box 1 and the user will just have to manage an elementary connection dialogue with the station 5.

It should be noted that as for the computer 4, it can manage more complex exchanges and that it is more beneficial in compliance with the invention to make it a service center located at a distance from all the stations 5, from all the users and from all the boxes 1, which will enable to protect it efficiently at the same time from possible attacks, both logical and physical.

If it is accepted that the system in accordance with the present invention offers, in all its features, a potentially confidential functional structure, this confidentiality should be based on the certainty that the integral parts of the system are those that are supposed to be.

Accordingly, an extra feature of the invention resides in that communications between two parts of the system are realized according to a protocol that enables the party receiving the message to authenticate the party who is supposed to have sent it. This authentication can be accompanied by the sending of an acknowledgement of receipt to the sending party. For this purpose, all the parties of the system have computerized systems for authenticating messages received from a transmitting party integrated into the system. In the event of the authentication of a message, the authentication systems are able to cooperate with the means of transmission to send systems an acknowledgement of receipt to the sender.

According to the invention, certain authentications are carried out in both directions as it is necessary, for example, for a box 1 to be sure that the computer 4 is not a clone computer and that, reciprocally, computer 4 can be sure that the box 1 is not a clone box. This process is called mutual parties authentication. In the same way, station 5, to which is connected a box 1, is authenticated, which prevents the existence of clone stations.

It should be noted that the authentication of the system by a user of the system (e.g. sender 2, security guard 3) is implicit. Thus, only one authentication of this user will be carried out, whether by the box 1, the computer 4 and perhaps in passing, by the station 5 to which the box 1 is connected. It is noted that station 5 does not own any means of integrating the user into the system; this is just a facility and an extra security intended to reject a non-authorized user.

Thanks to the logical structure of the boxes 1 organized in limited mode machines and to the physical and functional architecture of the links existing between the various parts of the system, the mutual authentication of the parties can be strictly managed. The structure also provides an unexpected flexibility in the management of the protection of funds, whether they are enclosed or not in a box 1.

Indeed, it is possible to interrupt a protective phase of the funds without having to re-examine it. These interruptions, which require the integration into the system of a new reliable part (informing of the "circumstances" leading, for example, to the derouting of the means of transport), and therefore the transition from a type of mode to another type of mode, necessarily imply a mutual authentication of the parties. Thus, when a delay in "normal" transport, traffic jams, breakdowns, etc., occurs, a solution other than the destruction of the funds contained in the box 1 can take place.

The conventional means for this authentication are many and for the most part of the computing type.

Thus an exact analogy can be established of the various principles for making safe the system in accordance with the invention using the principles for making safe a memory board. In particular, we can consider that the box 1, which is logically and physically tamper-proof, is equivalent to a real memory board.

The measures to be taken for the safety of the box 1 and for the safety of the transactions in which it takes part are therefore well known and aim to eliminate, on one hand, the threats against the confidentiality of the messages exchanged between the two integral parts of the system, of which the box is one, and on the other hand, threats against the integrity of these messages (voluntary or involuntary alteration of their content).

A first measure for eliminating threats against the confidentiality consists in coding the exchanges messages, and to do so, there are a number of known cryptography processes.

According to the invention, it was chosen to use a symmetrical type of coding algorithm named as DES (English Data Encryption Standard), the characteristics of which are standardized and which we can consult, for example, in a publication referenced to as FIPS PUB 46 (Federal Information Processing Standards Publication 46). According to this algorithm, a pair of devices, such as, for example, box 1 and computer 4, owns a key K. The key K is placed in a memory of the box 1 where it is physically protected, while the computer 4 memorizes, according to the preferred version of the invention, the keys K shared with all the boxes 1.

This version is preferable because it is possible that an attacked box 1 may not completely destroy the key which is recorded in it, allowing its recovery, and thus the theft of the contents of the other boxes 1 using a clone. In spite of the fact that the DES algorithm is a public algorithm, only the knowledge of the key K will enable the reading of a message that is coded with the key. Thus, it is an authentication in itself of the message, which might be considered as sufficient for the working of the system. However, an interference in the message on the communication line is not detected. It is therefore preferable to authenticate the message before decoding it.

A measure for eliminating threats against the integrity of the message consists in adding a signature to the message. A signature can be sent at the same time as the message, to act as a verification by the addressee in order to authenticate the message and its author.

It should be noted that this signature has nothing to do with the "token" symbolizing, that is, the transfer of responsibility attached to the protection of the funds enclosed or not enclosed in the box 1. The "token" is a message like any other, and is not necessarily transmitted during an authentication operation. For example, it is never transmitted to station 5, which should, however, be authenticated by its partners either directly or indirectly. The signature is a proof and the taking into account of the messages is only possible after verification of this proof.

According to an additional feature of the invention, this signature, or proof, is calculated on the parameters of the transaction, i.e. the content of the messages, according to an algorithm similar to the DES coding algorithm, which gives the notable advantage of simplifying the elaboration of the messages exchanged between the different parts of the system. The coding and authentication keys are different, which increases the cryptographic security.

Moreover, it becomes beneficial to integrate a "DES chip" into the electronic circuit to code and authenticate the messages. The "DES chip" can be placed inside each of the boxes 1. The use of a "DES chip" allows the memorization of all the keys, and to destroy the keys more easily in the case of an attack. In addition, a microprocessor manages the electronic system of the box 1 and a software implantation of the DES algorithm in this microprocessor would occupy far too much memory.

The DES chip therefore carries out, at the same time, the coding of the message and the realization of the signature of this message.

Nevertheless, it should be noted that the coding is not a compulsory operation, since the knowledge of the content of the message by a third party, for example, the instructions for the changing of modes and the parameters of the transport, do not endanger the security of the system. Only the authentication given by the signature on these messages counts, and it would therefore not be possible to circumvent the electronic system of a box with a false message that is not authenticated. The coding is a precaution which serves mainly to reassure the users of the confidentiality of the system.

Moreover, certain secret codes might be transmitted between two parts of the system; coding therefore becomes necessary to protect these codes.

Stations 5 also own a "DES chip" that are physically protected, and which contain keys for the coding and authentication of the messages transmitted to the supervisor computer 4. It should be noted that these keys are different from the keys used by the boxes 1. A message for the computer 4, coming from a box 1 is in this way double coded and authenticated; once by the box 1 by the first set of keys and then by the station 5 with the second set of keys.

According to the preferred embodiment of the present invention, a symmetrical coding algorithm has been chosen; i.e. an algorithm for which the same key is used by the two parties. This algorithm is perfectly suitable for transactions which are established between the box 1, the station 5 and the supervisor computer 4, since they can be equipped with electronic circuits used for this purpose without any problem. As previously noted, the coding key is different from the key used for realizing the signature. This means that to authenticate all the other parties, each part of the system should share with the others a single set of keys. In particular, each box 1 should be able to authenticate each of the stations 5 to which it can be connected, each station 5 having to authenticate each box 1. The number of keys to be memorized under such conditions soon becomes excessive and, according to the preferred embodiment of the invention, it was chosen to carry out the authentications indirectly, namely between the boxes 1 and the stations 5.

In compliance with FIG. 2, an indirect authentication is possible by transitivity, i.e. if two parts A and B are mutually authenticated, and if part A and part C are also mutually authenticated, then parts B and C mutually authenticate each other through part A, since it is a known reliable partner to all the parties. Thus, in order for a new part B to be authenticated by all the parts A, C already integrated into the system, it is sufficient if, on one hand, the authentication methods of just one of the parts A, C, in direct relation with the new part B authenticates the messages emitted by the latter and, on the other hand, if the authentication methods of the new part B authenticates or authenticated the messages emitted by the integrated part A in direct relation with it.

According to the preferred version of the invention, the supervisor computer 4 plays the role of part A, the small boxes 1, the stations 4 and the users playing the role of parts B and C. Only the computer 4 knows all the keys. The other parties only share a sole key with the computer 4.

This system does have a downside. Each time two parts of the system communicate, it is necessary that these two parts establish a direct connection with the computer 4, so that, first of all, they mutually authenticate each other with the computer, and then, make sure that the other part is already authenticated.

The computer 4 becomes a necessary intermediary in the transactions and can, unexpectedly, memorize the past communications. Computer 4 is consequently an unsuspected memory of the system.

The authentication of the users of the system remains, according to the invention, a particular case that should be noted.

In a first version, each user has a secret code enabling him to have access to the system. This code is known by the supervisor computer 4 which transmits it sometimes, to box 1 when this box is in a mode where its knowledge is necessary. Station 5, which connects the parts, may also know this code so as not to authorize a connection between the user and the computer 4 without prior checking. It is therefore obvious that this code transmits between the parts. However, so as to avoid easy reading by a third part that is fraudulently connected to the network, this code can be coded during its transmission through station 5 by means of the algorithm used in the invention.

Another process consists in using a unilateral function f for protecting this code. A unilateral function f is a function which is very difficult to calculate (for example, a power function). If a is a code, b=f(a) is known of station 5 or box 1. The knowledge of b does not enable one to find a. Thus, code a is protected. If the user enters code c, station 4 or box 1, calculates d=f(c) and compares d and b. If d=b, then c equals a. According to the invention, a particularly beneficial unilateral function to use if f=DES (x, a) where x is a fixed message and a is the secret code. The "DES chip" can be used once again in this example.

In another version of the authentication of a system user, the procedure is in compliance with the authentication processes used between the other parts. The user has a memory board and a fixed code. After the internal recognition of the code, the board generates a "token" which is sent to the system. This "token" is coded and signed by the same algorithms as those used elsewhere—the DES algorithm is implemented for this purpose in the board microprocessor. The confidentiality and integrity remains intact since the information which circulates between the parties is entirely random and does not enable one to trace the code or coding and authentication keys. To enter the system, it is therefore necessary to own both the board and the code.

Now, in accordance with FIG. 3, we shall describe the preferred organization of the system in compliance with the invention, and in particular the various logical states, or modes, that can characterize a box 1. We shall also describe the transitions between these modes, by following the "history" of box from the deposit of the funds to its opening, after the box 1 is delivered to the addressee.

In FIG. 3, the modes are represented by ellipses containing a two-letter code each representing the name of a mode. These modes, which will be defined later, are respectively:

a Departure mode represented by the code DP;
a Pavement mode represented by the code TR;
a Base mode represented by the code SC;
a Truck mode represented by the code CM;
an Alarm mode represented by the code DA;
a Connect mode represented by the code CO;
a Dual mode represented by the code VO;
a Self mode represented by the code SO;
an Open mode represented by the code OV;
a Box mode represented by the code CA;
a Safe mode represented by the code CF;
a Pay mode represented by the code VE;
a Close mode represented by the code FE;
a Lock mode represented by the code VR;
a Refusal mode represented by the code RF.

In FIG. 3, the blocks denoted as CS represent the establishment of a connection between the box 1 and the supervisor computer 4.

The present invention will be described with respect to funds, such as, for example, bank cards, banknotes and checks, that a head branch of a bank wants to send to another branch situated at some distance.

The funds are initially under the responsibility of the Manager of the head branch. There is a local station 5 that belongs to the network comprising the protective system, in accordance with the invention. Station 5, called a departure station, is connected to small box 1 (several can be connected) which does not necessarily contain funds. In this situation, the three modes possible for box 1 are an Open mode, a Box mode and a Safe mode.

In the Open mode, the box 1 is considered as being open, but its physical opening, thanks to means provided for this purpose, is not absolutely necessary; it can be opened and closed like a simple drawer, the protection of the funds placed inside being non-existent. Neither box 1, nor computer 4, nor the departure station are responsible for this.

The Box mode is a "local" mode, in which the transition towards this mode from the Open mode is possible without any intervention of the computer 4. In this mode, the Branch manager places funds in the box 1. The box is then closed and can only be opened again by means of an authentication by the branch manager; i.e., for example, by means of a secret code a of which the box 1 and the departure station only know the transformed version by a unilateral function, such as the DES function (x, a). It can be noted that the fixed message x is different for box 1 and for the station. The responsibility of the protection of the funds is therefore shared in the Box mode between the branch manager and box 1 (it should be reminded that the departure station, which is the common transmission terminal of the network, is never responsible). The transition from the Open mode to the Box mode should be noted: we have gone from the system:branch manager to the system:branch manager/box.

The Safe mode is a "global" mode in which the transition from the Open mode to this mode is only possible with the authorization of the supervisor computer 4 located at a distance. In this mode, the branch manager entrusts the funds to the system and transmits the whole responsibility of their protection. After having placed the funds in box 1 and closed it, the branch manager gives its code which is authenticated by the departure station and informs the system that he wishes to place the box 1 in the Safe mode. The departure station establishes a connection with the computer 4, in compliance with a mutual authentication protocol. The computer 4 then authenticates the branch manager. The box 1 in which he wishes to place the funds should be in a suitable state and not be a clone; it should therefore be able to mutually authenticate itself with the computer 4 through the departure station, which is a reliable partner of the computer 4, but which cannot directly authenticate the small box 1, for the above mentioned reasons. All these authentications being directly or implicitly carried out, the system, through the computer 4, accepts on one hand the transfer of responsibility coming from the Branch Manager and, on the other hand, turns the box 1 into the Safe mode. In the transition from the Open mode to the Safe mode, we have gone from the system:branch manager to the system:box/computer. This transition occurred gradually, the responsibility belonging to the branch manager until a final agreement from the computer 4—there were successive extensions and then a narrowing of the system.

The transition from the Safe mode to the Open mode is carried out in an identical way, with computer 4 retaining the responsibility for the protection of the funds until complete authentication of all the parts occurs. In this case, we pass from the system:box/computer to the system:box/computer/station and then to the system:box/computer/station/branch manager and finally to the system:branch manager with transfer of responsibility in the Open mode.

The transitions from the Open mode to the Box or Safe modes may also depend on a time programming, transmitted by computer 4 to box 1 when it arrives at the branch. Such a time programming may be weekly and prevent the opening of the box 1 outside certain hours that are fixed in advance. According to a variant of the invention, not shown, the modes Box and Safe can be grouped into a single mode called, for example, a Storage mode, to which can be added two opening options—Box or Safe—the choice between these options being made by a time programming transmitted at a given time to the box 1 by the computer 4.

Starting from the Box mode or the Safe mode, the branch manager can ask to send funds to the branch. To do so, there is a Pay mode, analogous to the Open mode, but which cannot be followed by the Box mode or Safe mode. The Pay mode takes place when the funds placed in box 1 are to be transported. The transitions from the Box mode or the Safe mode to the Pay mode are realized in the same way as the transitions of these modes to the Open mode, i.e. they are initiated by the prior authentication of the Branch Manager's code.

After closing box 1 in the Pay mode, the box automatically switches to the Closed mode, in which it is impossible to open the box without connecting it to a computer 4. The transition from the Pay mode to the Closed mode means that the system:box has temporarily accepted the transfer of responsibility. This mode is, however, temporary, since a connection is immediately established, via the departure station with the computer 4, so as to obtain its agreement on this payment. In the case of refusal (which might happen, for example, if the arrival station does not exist or no longer exists, or if the small box 1 is no longer in a suitable state), the box 1 turns to the Refusal mode and then to the Open mode and the procedure for sending the funds is cancelled. In the case of agreement by the computer 4, and after the necessary mutual authentications, there is a transition form the Closed mode to the Lock mode, during which the system:box/computer is responsible for the funds.

In the Lock mode, box 1 is transported to the arrival station to be able to be opened (unless otherwise indicated by the computer 4). The system then waits for the security guard 3 transporting the box 1 which is authenticated at its arrival by the verification of a code, of which the transformed version by a unilateral function is known; a connection is established with computer 4 who alone knows this code and the corresponding unilateral function (it is not necessary for the box 1 or the station to know it). It should be noted that the Lock mode can last for a long time; computer 4, which has received the transport parameters from the station, has not yet transmitted them to box 1. One of these parameters is the planned duration of the transport—in compliance with the French patent FR-2 550 364, instructing as to the length of time that the journey should take before box 1 is destroyed.

After authentication by the security guard 3, the computer 4 gives the authorization for picking up the box 1 which is then in the Departure mode. The transition from the Lock mode to this mode with the transfer of responsibility of the system:box/computer to the system:box; i.e. the box 1 ensures the total protection of the funds to be transported. That is why instructions as to the duration of the transport are initiated as soon as it changes to the Departure mode: box 1 consequently is considered to be mobile, whether or not it is physically removed from its base. Should the time planned for delivery be exceeded, the box considers itself as having been attacked and destroys its content by a suitable means.

After its physical removal, box 1 switches the Departure mode to the Pavement mode. This corresponds to the distance by foot that the security guard follows, transporting the box 1 between the departure station and a vehicle or another station (if the whole journey is carried out on foot). This mode is limited in time by a duration planned for this purpose, so as to reduce the risk of derouting during the journey. Should the planned duration of the journey be exceeded, box 1 will destroy its content.

The transport from the head branch of the Bank to another branch is generally carried out by means of a vehicle. The vehicle has an on-board computer that manages an electronic system to control the boxes 1 to be transported. The physical connection of a box 1 that is in the Pavement mode to this electronic system causes the mode of the box 1 to change from the Pavement mode to the Base mode. The physical receptacle of box 1 is the same as that situated in a station. Box 1 sends an identification message to the electronic system:

- if it recognizes a station, wherein it immediately asks for a connection to the supervisor computer 4, resulting in a transition to the Connect mode;
- if it recognizes the electronic system of the right vehicle, there is transition to the Truck mode; and
- if it recognizes neither one nor the other, there is a transition to the Alarm mode.

In the Alarm mode, box 1 is physically in an unexpected situation and should be disconnected from it receptacle. If not, after the expiration of a predetermined time (for example, 30 seconds), the calculation of the duration of the journey on foot starts again. However, box 1 waits to be disconnected before passing logically again from the Alarm mode to the Pavement mode; in this way, the Pavement mode always corresponds to the physical disconnection of the box 1.

The Truck mode corresponds to the transport of the box 1. In this mode, the box 1 cannot be disconnected without having been informed beforehand. That is, the box 1 will destroy its content after the elapse of a predetermined time (for example, 10 seconds) after being disconnected from its receptacle, unless such disconnection is authorized, or if the box is not reconnected to the receptacle. When the vehicle arrives at the branch, the security guard 3 authenticates himself with box 1 through the on-board computer—the code of the security guard 3 has been provisionally transmitted to box 1 by the supervisor computer 4 during the transition from the Lock mode to the Departure mode. If box 1 accepts the code of the security guard 3, it will pass into the Departure mode (from where it can pass into the Base mode and, finally, into the Connect mode).

It is important to note that the organization of the system into modes makes an intervention feasible in the case of an accident of the initial vehicle. It would then be sufficient to send to the place of the accident a vehicle having a recognition code that is known to box 1, to disconnect box 1 from the vehicle that is involved in the accident with the code of the security guard 3 and to connect the box 1 to a receptacle in the new vehicle—the computer 4 transferring the registration numbers of the two vehicles to box 1 during the transition for the Lock mode to the Departure mode. In this way, it is possible to pass several times between the Base, Truck or Departure modes during the transport from a departure station to an arrival station; only the instruction concerning the time should be observed.

The transition from the Base mode to the Connect mode will take place if box 1 recognizes that it is connected to a station. It then immediately asks to be connected to the supervisor computer 4, which requires the prior mutual authentication of the station and the computer 4. If this mutual authentication is possible, we know that the station is not a clone. The computer 4 and box 1 then mutually authenticate each other. If the station to which box 1 is connected is not the right one, a transition from the Connect mode to the Alarm mode occurs. If the station is the planned arrival station, the system:box becomes the system:box/ computer/arrival station and we pass from the Connect mode to the Self mode or Dual mode.

The choice between these two modes is made by the supervisor computer 4 at the time of mutual authentication of the box 1/computer 4. These modes are conceptually similar in the Box mode and Safe mode, respectively, but always finish in the Open mode already described, in which box 1 is considered as being opened. In the Self mode, only box 1 authenticates the branch manager's code, so as to be opened. In the Dual mode, after authentication of this code by box 1, the box asks to be connected to the computer 4, which, in turn, will carry out the required authentications.

In the Open mode, the box 1 can be emptied of its funds, the responsibility for their protection being transferred to the branch manager.

The small box 1 can again be used either as a box, or a safe, or for another transport in compliance with the processes described above.

Many versions of this preferred organization of the system can of course be considered without exceeding the scope of the invention, and can combine, in any order, the three types of modes possible. The only condition to be respected to do so is the observance of the authentication procedures during the extension or restrictions of the system, i.e. during the transfer of the responsibility attached to the protection of the funds.

It should also be noted that the use of the coding algorithms for the messages exchanged through the various parts of the system requires connection supports that are reliable and which have a low rate of error.

This is not necessarily the case, as the infrastructure to be set up could be expensive, especially for the banks and their branches, where, integrated into the station 5, there needs to be means for communicating with the supervisor computer 4, such as, for example, expensive modems, specialized liaisons with low rates of error, etc. But these branches generally only have normal telephone lines that have a high rate of error.

Consequently, a protocol is required to be set up for the correction of transmission errors between a system terminal, or station 5, and the supervisor computer 4. The protocol breaks the message to be transmitted into blocks of between a few bytes to several tens of bytes. If a block is transmitted with errors, only this block is retransmitted, which avoids having to repeat a whole, long message exchanged (typically of a length of 300 bytes). The integrity of a block is checked by means of a signature elaborated with the content of the block, and with its heading, the latter including mainly information on the length of the block. The calculation algorithm of this non secret signature will be advantageously used for coding and for the authentication of the messages. In this way, we again use the "DES chip," without having to write and stock a new algorithm, particularly in the station.

After reconstruction of the broken message, and in the case where the sender is the supervisor computer 4, station 5 authenticates and decodes with its own keys the message (thanks to the "DES chip" placed within the station). Then, it transmits to box 1, whose registration number is used to identify it, the part of the message which is intended for it. Box 1 authenticates and decodes this message with its own keys, thanks to the "DES chip" provided for this purpose. It then confirms the reception to the computer 4 and prepares a coded message, authenticated with these same keys. This message is transmitted to the computer 4, completed by the registration number of the box 1, coded and authenticated with the keys of station 5. Computer 4 then sends back, according to the same protocol, a receipt to box 1, which may possibly change modes upon reception of this receipt.

The telecommunication protocol described above is not limited to the preferential realization described above, and we can, for example, use functional architectural principles made popular by the interconnection model of open systems (layer model OSI) or the direct derivatives of this model.

This invention is particularly intended for the protection of documents or valuable objects, and in particular articles such as banknotes, checks or bank cards, or for dangerous drugs (narcotics) having a considerable value. Protection is assured both inside a bank (or chemist's shop or other), and during the transport from this bank to another branch. This invention is limited neither by the size, nor by the weight of the documents or valuables that are to be protected, and it is easy for one skilled in the art to carry out any alteration to adapt the invention to objects or documents other than those which were discussed herein as non limitative examples.

We claim:

1. A system for protecting items transported between a plurality of locations, comprising:

a plurality of storage boxes, one storage box housing an item and having an internal management system for controlling a plurality of operating modes of said protecting system, said internal management system having a memory that stores data pertaining to a current operating mode of said one storage box, in which transitions between operating modes take place upon the occurrence of specific events;

a security receptacle for maintaining the security of said plurality of storage boxes;

a supervisory computer that communicates with said internal management system to determine an existence of an unauthorized action, wherein if an unauthorized action is determined to exist, said item in said one storage box is destroyed and said data in said memory is erased, said supervisory computer further authorizing an operating mode transition of said one storage box when said operating mode is a global mode;

a station, wherein said plurality of storage boxes, said security receptacle, said computer and said station are arranged in the configuration of a star network to communicate with each other and effect said transitions between operating modes; and means for authorizing and verifying said transitions between operating modes.

2. The protection system of claim 1, said authorizing and verifying means mutually authorizes at least one of said internal management system, said security receptacle, said computer and said station.

3. The protection system of claim 1, said authorizing and verifying means employs a key algorithm.

4. The protection system of claim 3, wherein said key algorithm comprises a DES code.

5. The protection system of claim 1, wherein said item is destroyed a predetermined period of time after said determination of said unauthorized action.

6. A system for protecting items transported between a plurality of locations, in which said items are destroyed upon an occurrence of an unauthorized action, comprising:

a plurality of storage boxes for housing said items to be transported between said plurality of locations, one storage box of said plurality of storage boxes storing an item and having an internal management system for controlling a plurality of operating modes of said protecting system, in which transitions between operating modes take place upon the occurrence of specific events; and a computer that communicates with said internal management system to determine an existence of said unauthorized action, at which time said item in said one storage box is destroyed, while erasing a memory of said internal management system that contains data pertaining to an operating mode that existed just previous to a mode that resulted in said distribution of said item, said computer authorizing an operating mode transition of said one storage box when said operating mode is a global mode.

7. The protection system of claim 6, wherein said computer operates as a service center.

8. The protection system of claim 6, wherein said plurality of operating modes change in response to predetermined actions taken with respect to said one storage box.

9. The protection system of claim 6, further comprising a station that is interconnected to said protection system in a star network arrangement.

10. The protection system of claim 9, wherein said station is unable to change an operating mode of said one storage box.

11. The protection system of claim 8, wherein said station comprises means for communicating with said one storage box of said plurality of storage boxes and said computer to effect said transitions between operating modes.

12. The protection system of claim 8, wherein said station comprises means for communicating with said one storage box of said plurality of storage boxes and at least one of a sender, addressee or guard of said item.

13. The protection system of claim 8, wherein said station comprises means for communicating with said one storage box of said plurality of storage boxes and at least one of a sender, addressee or guard of said item to effect said transitions between operating modes.

14. The protection of claim 6, further comprising means for verifying an authenticity of communications between said plurality of storage boxes and said computer.

15. The protection system of claim 14, further comprising means for acknowledging said authenticity of said communication.

16. The protection system of claim 15, wherein said verifying means comprises a signature calculated from a content of said communication using a key algorithm to authenticate said communication.

17. The protection system of claim 14, wherein parts of said protection system are mutually authenticated.

18. The protection system of claim 6, wherein said computer is located at a location that differs from a location at least one of said plurality of storage boxes.

* * * * *

UNITED STATES PATENT AND TRADEMARK OFFICE
CERTIFICATE OF CORRECTION

PATENT NO. : 5,315,656
DATED : May 24, 1994
INVENTOR(S) : Franklin DEVAUX et al.

It is certified that error appears in the above-indentified patent and that said Letters Patent is hereby corrected as shown below:

On the cover page, under "[30] Foreign Application Priority Date" add ---July 17, 1990 [PCT/FR] PCT 90/00538---.

At column 13, line 34 of the printed patent, change "box" to ---box 1---.

At column 17, line 41 (claim 6, line 20), change "distribution" to ---destruction---.

Signed and Sealed this

Fifth Day of March, 1996

Attest:

BRUCE LEHMAN

*Attesting Officer* *Commissioner of Patents and Trademarks*